(12) United States Patent
He et al.

(10) Patent No.: US 12,245,066 B2
(45) Date of Patent: Mar. 4, 2025

(54) METHOD AND APPARATUS TO SUPPORT CONDITIONAL MANDATORY MEASUREMENT GAP PATTERNS

(71) Applicant: NOKIA SOLUTIONS AND NETWORKS OY, Espoo (FI)

(72) Inventors: Jing He, Beijing (CN); Ping Yuan, Beijing (CN); Lars Dalsgaard, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 390 days.

(21) Appl. No.: 17/760,291

(22) PCT Filed: Feb. 13, 2020

(86) PCT No.: PCT/CN2020/075030
§ 371 (c)(1),
(2) Date: Aug. 5, 2022

(87) PCT Pub. No.: WO2021/159373
PCT Pub. Date: Aug. 19, 2021

(65) Prior Publication Data
US 2023/0115464 A1    Apr. 13, 2023

(51) Int. Cl.
*H04W 24/10* (2009.01)
*H04W 8/22* (2009.01)
*H04W 76/15* (2018.01)

(52) U.S. Cl.
CPC .......... *H04W 24/10* (2013.01); *H04W 8/22* (2013.01); *H04W 76/15* (2018.02)

(58) Field of Classification Search
CPC ....... H04W 24/10; H04W 8/22; H04W 76/15; H04W 48/16; H04W 36/0088
See application file for complete search history.

(56) References Cited

U.S. PATENT DOCUMENTS

2014/0073314 A1    3/2014  Pradas et al.
2014/0341192 A1*  11/2014  Venkob ............ H04W 52/0216
                                                              370/336
(Continued)

FOREIGN PATENT DOCUMENTS

CN    108810929 A    11/2018
CN    110035443 A     7/2019
(Continued)

OTHER PUBLICATIONS

Samsung Measurement Gap Configuration for EN-DC (Year: 2018).*
(Continued)

*Primary Examiner* — Ayanah S George
(74) *Attorney, Agent, or Firm* — Robert P. Michal, Esq.; Carter, DeLuca & Farrell LLP

(57) ABSTRACT

Method for measurement gap configuration comprising: sending a first message including a first measurement gap configuration based on a UE(10) new measurement gap capability from a first network device(20) to the UE(10); detecting at the first network device(20) whether a legacy gap assisted measurement is required for the UE(10); responsive to the legacy gap assisted measurement being required, sending a second message including a second measurement gap configuration based on a UE(10) legacy measurement gap capability from the first network device (20) to the UE(10); sending a third message indicating fallback of the UE(10) the legacy measurement gap capability from the first network device(20) to a second network device(30) in communication with the UE(10).

18 Claims, 6 Drawing Sheets

(56) References Cited

U.S. PATENT DOCUMENTS

| | | |
|---|---|---|
| 2018/0077596 A1 | 3/2018 | Huang et al. |
| 2018/0213425 A1 | 7/2018 | Huang et al. |
| 2019/0097877 A1 | 3/2019 | Yiu et al. |
| 2019/0173634 A1 | 6/2019 | Teyeb et al. |
| 2019/0174343 A1 | 6/2019 | Cui et al. |
| 2019/0253909 A1 | 8/2019 | Yiu et al. |
| 2021/0105651 A1 | 4/2021 | Chen |

FOREIGN PATENT DOCUMENTS

| | | | |
|---|---|---|---|
| CN | 110140377 A | 8/2019 | |
| CN | 110621071 A | 12/2019 | |
| CN | 110740050 A | 1/2020 | |
| CN | 108810929 B | 3/2021 | |
| WO | WO-2017027066 A1 * | 2/2017 | ............ H04W 24/10 |
| WO | 2018/228473 A1 | 12/2018 | |
| WO | 2019/098928 A1 | 5/2019 | |
| WO | 2019139529 A1 | 7/2019 | |

OTHER PUBLICATIONS

International Search Report and Written Opinion for International Application No. PCT/CN2020/075030, mailed on Nov. 17, 2020, 7 pages.

Office Action for India Application No. 202247051938, mailed on Mar. 2, 2023, 7 pages.

"Revised WID: NR RRM enhancement in R16", 3GPP TSG RAN Meeting #85, RP-192157, Agenda: 9.4.26, Intel Corporation, Sep. 16-20, 2019, 5 pages.

"MR-DC measurement gap pattern capability", 3GPP TSG-RAN WG2 Meeting #107, R2-1911814, Qualcomm Incorporated, Aug. 26-30, 2019, 6 pages.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

Office action received for corresponding Japanese Patent Application No. 2022-548396, dated Sep. 26, 2023, 3 pages of office action and 4 pages of translation available.

"Discussion on remaining issues in UE measurement mode", 3GPP TSG-RAN WG4 Meeting #86bis, R4-1803687, Agenda: 7.9.3.2, MediaTek Inc., Apr. 16-20, 2018, 2 pages.

"UE Capabilities and configuration of per CC measurement gaps", 3GPP TSG-RAN WG4 Meeting # 79, R4-163463, Agenda: 7.16.2, Ericsson, May 23-27, 2016, 7 pages.

European Search Report for Application No. 20918487.8, mailed on Aug. 7, 2023, 10 pages.

3GPP TSG-RAN 2G Meeting#NR Adhoc; R2-1800625;"Measurement Gap Configuration for EN-DC"; Agenda item: 10.4.1.4.2; Source: Samsung; Vancouver, Canada; Jan. 22-26, 2018; 4 pages.

Office Action received for corresponding Chinese Patent Application No. 202080096459.X, dated Aug. 30, 2024, 15 pages of Office Action and no page of translation available.

* cited by examiner

500

600

METHOD AND APPARATUS TO SUPPORT CONDITIONAL MANDATORY MEASUREMENT GAP PATTERNS

CROSS-REFERENCE TO RELATED APPLICATIONS

This application is a national stage entry of International Application No. PCT/CN2020/075030, filed Feb. 13, 2020, entitled "METHOD AND APPARATUS TO SUPPORT CONDITIONAL MANDATORY MEASUREMENT GAP PATTERNS" which is hereby incorporated by reference in its entirety.

TECHNICAL FIELD

Various exemplary embodiments generally relate to communication technologies, and more particularly, to methods and apparatuses to support conditional mandatory measurement gap patterns.

BACKGROUND

Certain abbreviations that may be found in the description and/or in the figures are herewith defined as follows:
eNB evolved Node-B
EN-DC E-UTRA NR dual connectivity
E-UTRA evolved universal terrestrial radio access
FR1 first frequency range
FR2 second frequency range
gNB 5G Node-B
GP gap pattern
LTE long term evolution
MCG master cell group
MG measurement gap
MN master node
MO measurement object
MR-DC multiple radio dual connectivity
NE-DC NR E-UTRA dual connectivity
NGEN-DC next generation E-UTRA NR dual connectivity
NR-DC NR NR dual connectivity
NSA non-standalone
NR new radio
RRC radio resource control
RRM radio resource management
SN secondary node
UE user equipment As like 4G LTE, 5G New Radio (NR) also performs various measurements to detect channel qualities for the purpose of cell selection, cell reselection and handover etc. Measurement Gaps (MGs) are designed for a user equipment (UE) to perform such measurements, during which the UE cannot transmit/receive data to/from the network. The network may configure a per-UE gap or a per-frequency range (per-FR) gap for the UE. The per-UE gap is applicable for both a first frequency range (FR1) and a second frequency range (FR2), and the per-FR gap includes two independent gaps, i.e., a FR1 gap and a FR2 gap, applicable for the FR1 and the FR2 respectively. The first frequency range (FR1) conventionally includes various bands from 450 MHz to 6,000 MHz, which is commonly referred to as NR sub-6 GHz, but has been extended to cover potential new spectrum offerings from 410 MHz to 7,125 MHz. The second frequency range (FR2) includes frequency bands from 24.25 GHz to 52.60 GHz, which is commonly referred to as mmWave, even though the millimeter wave frequency may start at 30 GHz strictly speaking. It would be understood that the per-UE gap and the per-FR FR1 gap may also be used for measurements of an LTE frequency as the NR FR1 overlaps and extends the 4G LTE frequencies.

In some scenarios associated with dual connectivity (DC) or multiple radio dual connectivity (MR-DC), different nodes are responsible for configuration of the per-UE gap and the per-FR gap, and gap configuration information exchanges between the nodes via inter-node messages. For example, 3GPP Release 15 (Rel-15) provides that: in (NG) EN-DC, a per-FR FR1 gap cannot be set up by NR RRC (i.e. only LTE RRC can configure the FR1 gap); in NE-DC, the per-FR FR1 gap can only be set up by NR RRC (i.e. LTE RRC cannot configure the FR1 gap); in NR-DC, the per-FR FR1 gap can only be set up in a measConfig information element (IE) associated with a master cell group (MCG). As for a per-FR FR2 gap, in (NG)EN-DC or NE-DC, it can only be set up by NR RRC (i.e. LTE RRC cannot configure the per-FR FR2 gap); in NR-DC, the per-FR FR2 gap can only be set up in the measConfig 1E associated with the MCG. For a per-UE gap, in (NG)EN-DC, it cannot be set up by NR RRC (i.e. only LTE RRC can configure the per-UE gap); in NE-DC, the per-UE gap can only be set up by NR RRC (i.e. LTE RRC cannot configure the per-UE gap); in NR-DC, the per-UE gap can only be set up in the measConfig 1E associated with the MCG. The above MR-DC measurement gap configuration mechanism is summarized in the below Table 1.

TABLE 1

| MR-DC Measurement Gap Configuration Mechanism in 3GPP Rel-15 | | | | |
| --- | --- | --- | --- | --- |
| Case# | MR-DC option | Gap type | Gap Deciding Node | Used UE capability |
| 1 | (NG)EN-DC | Per-UE gap | (ng)eNB | E-UTRA capability |
| 2 | | Per-FR gap - FR1 | (ng)eNB | E-UTRA capability |
| 3 | | Per-FR gap - FR2 | gNB | NR capability |
| 4 | NE-DC | Per-UE gap | gNB | NR capability |
| 5 | | Per-FR gap - FR1 | gNB | NR capability |
| 6 | | Per-FR gap - FR2 | gNB | NR capability |
| 7 | NR-DC | Per-UE gap | gNB (MCG) | NR capability |
| 8 | | Per-FR gap - FR1 | gNB (MCG) | NR capability |
| 9 | | Per-FR gap - FR2 | gNB (MCG) | NR capability |

Summary

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for more detailed description provided below.

In a first aspect, exemplary embodiments of a method for measurement gap configuration are provided. The method may comprise sending a first message including a first measurement gap configuration from a first network device to a user equipment UE, the first measurement gap configuration being based on a UE new measurement gap capability. The method may further comprise detecting at the first network device whether a legacy gap assisted measurement is required for the UE. If it is determined that the legacy gap assisted measurement is required for the UE, a second message including a second measurement gap configuration based on a UE legacy measurement gap capability may be sent from the first network device to the UE. The method may further comprise sending a third message indicating fallback of the UE to the legacy measurement gap capability from the first network device to a second network device in communication with the UE.

In some embodiments, the method may further comprise, after sending the second message, receiving at the first network device a fifth message from the UE indicating that the UE still has a measurement associated with the second network device based on the UE new measurement gap capability.

In some embodiments, the method may further comprise detecting at the first network device whether no legacy gap assisted measurement exists for the UE. If it is determined that no legacy gap assisted measurement exists for the UE, a fourth message indicating restoration of the UE new measurement gap capability may be sent from the first network device to the second network device.

In some embodiments, the method may further comprise receiving at the first network device a sixth message from the UE indicating that the UE still has a legacy gap assisted measurement associated with the second network device.

In some embodiments, the third message may include an explicit indicator or a list of frequencies measured by the legacy gap assisted measurement to indicate the fallback, and the fourth message may include an explicit indicator or an empty list of frequencies measured by the legacy gap assisted measurement to indicate the restoration.

In some embodiments, the first network device may act as a master node (MN) for a master cell group (MCG) operated in a first frequency range (FR1), and the second network device may act as a secondary node (SN) for a secondary cell group (SCG) operated in a second frequency range (FR2).

In some embodiments, the UE may operate in a dual connectivity mode, e.g., EN-DC, NGEN-DC or NR-DC mode, to communicate with both the first network device and the second network device and may be configured with respective measurement gap configurations from the first network device and the second network device independently.

In some embodiments, the first measurement gap configuration and the second measurement gap configuration may be per-frequency range (per-FR) configurations.

In some embodiments, the legacy gap assisted measurement may comprise a measurement to an LTE frequency.

In some embodiments, the UE legacy measurement gap capability may comprise a static gap capability, and the UE new measurement gap capability may comprise a conditional mandatory gap capability applied when no legacy gap assisted measurement exists.

In some embodiments, the UE legacy measurement gap capability may comprise a gap capability defined in 3GPP Release 15, and the UE new measurement gap capability may comprise a conditional mandatory gap capability introduced in 3GPP Release 16 or later.

In a second aspect, exemplary embodiments of a method for measurement gap configuration are provided. The method may comprise sending a first message including a first measurement gap configuration based on a user equipment (UE) new measurement gap capability from a second network device to a UE, and receiving at the second network device a second message from a first network device or from the UE indicating fallback to a UE legacy measurement gap capability. Responsive to the second message, a third message including a second measurement gap configuration based on the UE legacy measurement gap capability may be sent from the second network device to the UE.

In some embodiments, the method may further comprise receiving at the second network device a fourth message from the first network device or from the UE indicating restoration of the UE new measurement gap capability. Responsive to the fourth message, a fifth message including a third measurement gap configuration based on the UE new measurement gap capability may be sent from the second network device to the UE.

In a third aspect, exemplary embodiments of a method for measurement gap configuration are provided. The method may comprise receiving at a user equipment UE a first message including a first measurement gap configuration based on a UE legacy measurement gap capability from a first network device. Responsive to the first message, a second message indicating fallback of the UE to the legacy measurement gap capability may be sent to a second network device in communication with the UE, and/or a third message indicating that the UE still has a measurement associated with the second network device based on a UE new measurement gap capability may be sent to the first network device in a case where the UE still has the measurement associated with the second network device based on the UE new measurement gap capability.

In some embodiments, the method may further comprise detecting at the UE whether the UE does not have a legacy gap assisted measurement in association with the first network device but still has a legacy gap assisted measurement in association with the second network device. If so, a fourth message indicating that the UE still has a legacy gap assisted measurement associated with the second network device may be sent to the first network device, and/or a fifth message indicating restoration of the UE new measurement gap capability may be sent to the second network device.

In a fourth aspect, exemplary embodiments of a network device are provided. The network device may comprise at least one processor and at least one memory including computer program code. The at least one memory and the computer program code may be configured to, with the at least one processor, cause the network device at least to perform: sending a first message including a first measurement gap configuration to a user equipment UE, the first measurement gap configuration being based on a UE new measurement gap capability; detecting whether a legacy gap assisted measurement is required for the UE; responsive to the legacy gap assisted measurement being required, sending a second message including a second measurement gap configuration to the UE, the second measurement gap configuration being based on a UE legacy measurement gap capability; and sending a third message indicating fallback of the UE to the legacy measurement gap capability to a further network device in communication with the UE.

In some embodiments, the at least one memory and the computer program code may be further configured to, with the at least one processor, cause the network device at least to perform: after sending the second message: receiving a fifth message from the UE indicating that the UE still has a measurement associated with the further network device based on the UE new measurement gap capability.

In some embodiments, the at least one memory and the computer program code may be further configured to, with the at least one processor, cause the network device at least to perform: detecting whether no legacy gap assisted measurement exists for the UE; responsive to no legacy gap assisted measurement existing, sending a fourth message indicating restoration of the UE new measurement gap capability to the further network device.

In some embodiments, the at least one memory and the computer program code may be further configured to, with the at least one processor, cause the network device at least to perform: receiving a sixth message from the UE indicating that the UE still has a legacy gap assisted measurement associated with the further network device.

In some embodiments, the third message may include an explicit indicator or a list of frequencies measured by the legacy gap assisted measurement to indicate the fallback. The fourth message may include an explicit indicator or an empty list of frequencies measured by the legacy gap assisted measurement to indicate the restoration.

In some embodiments, the network device may act as a master node (MN) for a master cell group (MCG) operated in a first frequency range (FR1), and the further network device acts as a secondary node (SN) for a secondary cell group (SCG) operated in a second frequency range (FR2).

In some embodiments, the UE may operate in a dual connectivity mode, e.g., EN-DC, NGEN-DC or NR-DC mode, to communicate with both the network device and the further network device, and the UE may be configured with respective measurement gap configurations from the network device and the further network device independently.

In some embodiments, the first measurement gap configuration and the second measurement gap configuration may be per-frequency range (per-FR) configurations.

In some embodiments, the legacy gap assisted measurement may comprise a measurement to an LTE frequency.

In some embodiments, the UE legacy measurement gap capability may comprise a static gap capability, and the UE new measurement gap capability may comprise a conditional mandatory gap capability applied when no legacy gap assisted measurement exists.

In some embodiments, the UE legacy measurement gap capability may comprise a gap capability defined in 3GPP Release 15, and the UE new measurement gap capability may comprise a conditional mandatory gap capability introduced in 3GPP Release 16 or later.

In a fifth aspect, exemplary embodiments of a network device are provided. The network device may comprise at least one processor and at least one memory including computer program code. The at least one memory and the computer program code may be configured to, with the at least one processor, cause the network device at least to perform: sending a first message including a first measurement gap configuration to a user equipment UE, the first measurement gap configuration being based on a UE new measurement gap capability; receiving a second message from a further network device or from the UE indicating fallback to a UE legacy measurement gap capability; and responsive to the second message, sending a third message including a second measurement gap configuration to the UE, the second measurement gap configuration being based on the UE legacy measurement gap capability.

In some embodiments, the at least one memory and the computer program code may be further configured to, with the at least one processor, cause the network device at least to perform: receiving a fourth message from the further network device or the UE indicating restoration of the UE new measurement gap capability; and responsive to the fourth message, sending a fifth message including a third measurement gap configuration to the UE, the third measurement gap configuration being based on the UE new measurement gap capability.

In a sixth aspect, exemplary embodiments of a user equipment UE are provided. The UE may comprise at least one processor and at least one memory including computer program code. The at least one memory and the computer program code may be configured to, with the at least one processor, cause the UE at least to perform: receiving a first message including a first measurement gap configuration from a first network device, the first measurement gap configuration being based on a UE legacy measurement gap capability; and responsive to the first message, sending a second message indicating fallback of the UE to the legacy measurement gap capability to a second network device in communication with the UE, and/or a third message indicating that the UE still has a measurement associated with the second network device based on a UE new measurement gap capability to the first network device in a case where the UE still has the measurement associated with the second network device based on the UE new measurement gap capability.

In some embodiments, the at least one memory and the computer program code may be further configured to, with the at least one processor, cause the UE at least to perform: detecting whether the UE does not have a legacy gap assisted measurement in association with the first network device but still has a legacy gap assisted measurement in association with the second network device; if so, sending a fourth message indicating that the UE still has a legacy gap assisted measurement associated with the second network device to the first network device, and/or a fifth message indicating restoration of the UE new measurement gap capability to the second network device.

In a seventh aspect, exemplary embodiments of an apparatus for measurement gap configuration are provided. The apparatus may comprise means for sending a first message including a first measurement gap configuration to a user equipment UE, the first measurement gap configuration being based on a UE new measurement gap capability, means for detecting whether a legacy gap assisted measurement is required for the UE, means for responsive to the legacy gap assisted measurement being required, sending a second message including a second measurement gap configuration to the UE, the second measurement gap configuration being based on a UE legacy measurement gap capability, and means for sending a third message indicating fallback of the UE to the legacy measurement gap capability to a further network device in communication with the UE.

In some embodiments, the apparatus may further comprise means for, after sending the second message, receiving a fifth message from the UE indicating that the UE still has a measurement associated with the second network device based on the UE new measurement gap capability.

In some embodiments, the apparatus may further comprise means for detecting whether no legacy gap assisted measurement exists for the UE; and means for responsive to no legacy gap assisted measurement existing, sending a fourth message indicating restoration of the UE new measurement gap capability to the further network device.

In some embodiments, the apparatus may further comprise means for receiving a sixth message from the UE indicating that the UE still has a legacy gap assisted measurement associated with the further network device.

In an eighth aspect, exemplary embodiments of an apparatus for measurement gap configuration are provided. The apparatus may comprise means for sending a first message including a first measurement gap configuration to a user equipment UE, the first measurement gap configuration being based on a UE new measurement gap capability, means for receiving a second message from a further network device or from the UE indicating fallback to a UE legacy measurement gap capability, and means for, responsive to the second message, sending a third message including a second measurement gap configuration to the UE, the second measurement gap configuration being based on the UE legacy measurement gap capability.

In some embodiments, the apparatus may further comprise means for receiving a fourth message from the first network device or from the UE indicating restoration of the UE new measurement gap capability, and means for, responsive to the fourth message, sending a fifth message including a third measurement gap configuration to the UE, the third measurement gap configuration being based on the UE new measurement gap capability.

In a ninth aspect, exemplary embodiments of an apparatus for measurement gap configuration are provided. The apparatus may comprise means for receiving at a user equipment UE a first message including a first measurement gap configuration from a first network device, the first measurement gap configuration being based on a UE legacy measurement gap capability, and means for, responsive to the first message, sending a second message indicating fallback of the UE to the legacy measurement gap capability to a second network device in communication with the UE, and/or a third message indicating that the UE still has a measurement associated with the second network device based on a UE new measurement gap capability to the first network device in a case where the UE still has the measurement associated with the second network device based on the UE new measurement gap capability.

In some embodiments, the apparatus may further comprise means for detecting at the UE whether the UE does not have a legacy gap assisted measurement in association with the first network device but still has a legacy gas assisted measurement in association with the second network device, and means for, if the UE does not have a legacy gap assisted measurement in association with the first network device but still has a legacy gas assisted measurement in association with the second network device, sending a fourth message indicating that the UE still has a legacy gap assisted measurement associated with the second network device to the first network device, and/or a fifth message indicating restoration of the UE new measurement gap capability to the second network device.

In a tenth aspect, exemplary embodiments of a computer readable medium are provided. The computer readable medium may have instructions stored thereon, and the instructions, when executed by at least one processor of an apparatus, may cause the apparatus to perform any one of the above methods.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Figure 1:
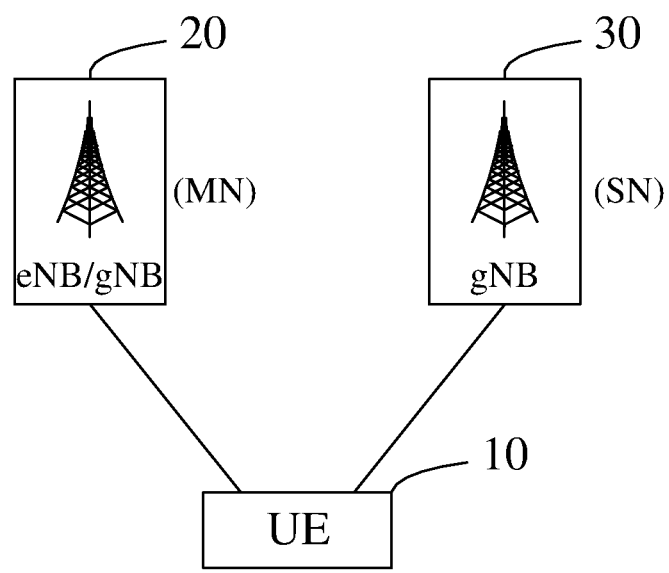
FIG. 1 illustrates a simplified diagram of an MR-DC architecture in accordance with exemplary embodiments.

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

Gap patterns are defined for the per-UE and per-FR gap configurations. In general, a GP may be defined with a gap duration and a gap repetition period. For example, 3GPP Rel-15 has defined GPs #0-23, among which GPs #0-11 are applicable for both FR1 and FR2 gap assisted measurements, while GPs #12-23 can only be applied to FR2 gap assisted measurements. It would be understood that the GPs #0-23 are merely described as examples in the present disclosure, and other GPs, for example nonuniform GPs, may also be defined for the FR1 and/or FR2 measurements. Among the GPs #0-23, only GPs #0-1 are currently mandatory. The GP #0 and the GP #1 are both of a 6 ms gap length and have 40 ms and 80 ms repetition periods respectively.

New (or additional) mandatory GPs would be desirable for various deployment scenarios of the 5G NR networks. A new mandatory GP with a shorter gap length would be beneficial for system efficiency, and a flexible repetition period of the mandatory GP would satisfy varying requirements on the measurement delay and gap overhead in various scenarios. In view of the potential benefits, 3GPP is expected to introduce the new mandatory GPs in Release 16 (Rel-16) specifications. However, solutions are still needed for applying the new mandatory GPs, especially in the MR-DC deployments of the 5G NR, without impact to the legacy implementations.

Exemplary embodiments described herein provide methods and apparatuses to support new (or additional) mandatory GPs in the MR-DC architectures. In the exemplary embodiments, the new mandatory GPs are merely mandated in certain conditions for the NR measurements and would not impact the legacy implementations. For example, in case of an LTE measurement, the new mandatory GPs should not be applied. New signaling is also proposed for introduction of the new mandatory GPs and the UE new measurement gap capability. In the exemplary embodiments, the new mandatory GPs may also be referred to as conditional/ dynamic mandatory GPs as they are mandated only in some certain conditions. In some examples, the new conditional mandatory GPs may comprise conditional mandatory GPs introduced in 3GPP Rel-16 or later specifications. The new conditional mandatory GPs may be selected from the existing GPs #2-23, preferably GPs #2-11 as the GPs #12-23 are only applicable for FR2 gap assisted measurements, or from new GPs designed in the future.

On the other hand, the UE legacy measurement gap capability refers to the UE's static capability to support GPs since the UE attaches to the network, which may also be referred to as static GPs in the present disclosure. Not like the conditional/dynamic mandatory GPs that can only be enabled in some certain conditions for the NR measurements, the static GPs are supported by the UE anytime for both the LTE measurements and the NR measurements since the UE attaches to the network. In some examples, the legacy/static GPs may include the GPs defined in the 3GPP Rel-15, including for example the mandatory GPs #0-1 and the non-mandatory GPs #2-23. It should also be understood that the legacy/static GPs are not limited to the GPs #0-23 currently defined in the 3GPP Rel-15, and GPs introduced in the future may also be deemed as legacy/static GPs if they are designed to be statically supported by the UE for both the LTE measurements and the NR measurements, like the existing GPs #0-23.

FIG. 1 illustrates a simplified diagram of an MR-DC architecture in accordance with exemplary embodiments. Referring to FIG. 1, in the MR-DC architecture, a UE 10 is connected to two base stations 20, 30. The first base station 20 may act as a master node (MN) including a group of serving cells (MCG) operated in a first frequency range (FR1), and the second base station 30 may act as a secondary node (SN) including a group of serving cells (SCG) operated in a second frequency range (FR2).

In some examples, the MN 20 may be an E-UTRA base station (MeNB), and the SN 30 may be an NR base station (SgNB). When the MeNB 20 is connected to a 4G core network, i.e. Evolved Packet Core (EPC) (not shown), the UE 10 may operate in the EN-DC mode. When the MeNB 20 is connected to a 5G core network (5GC) (not shown), the UE 10 may operate in the NGEN-DC mode. In the (NG) EN-DC mode, the MeNB 20 is responsible for the per-UE and per-FR FR1 gap configuration of the UE 10, and the SgNB 30 is responsible for the per-FR FR2 gap configuration of the UE 10. That is to say, the UE 10 may be configured with respective measurement gap configurations from the MN 20 and the SN 30 independently.

In some examples, the MN 20 may be an NR base station (MgNB) and it may be connected to the 5GC. In such a case, the UE 10 may operate in the NR-DC mode. It should be noted that in the NR-DC mode, the MgNB 20 is responsible for the per-UE and per-FR FR1 gap configuration of the UE 10, and the SgNB 30 is responsible for the per-FR FR2 gap configuration of the UE 10. That is to say, the UE 10 may be configured with respective measurement gap configurations from the MN 20 and the SN 30 independently. In some other examples, alternatively, the per-FR FR2 gap configuration may be under the responsibility of the MgNB 20, as defined in 3GPP Rel-15.

Figure 2:
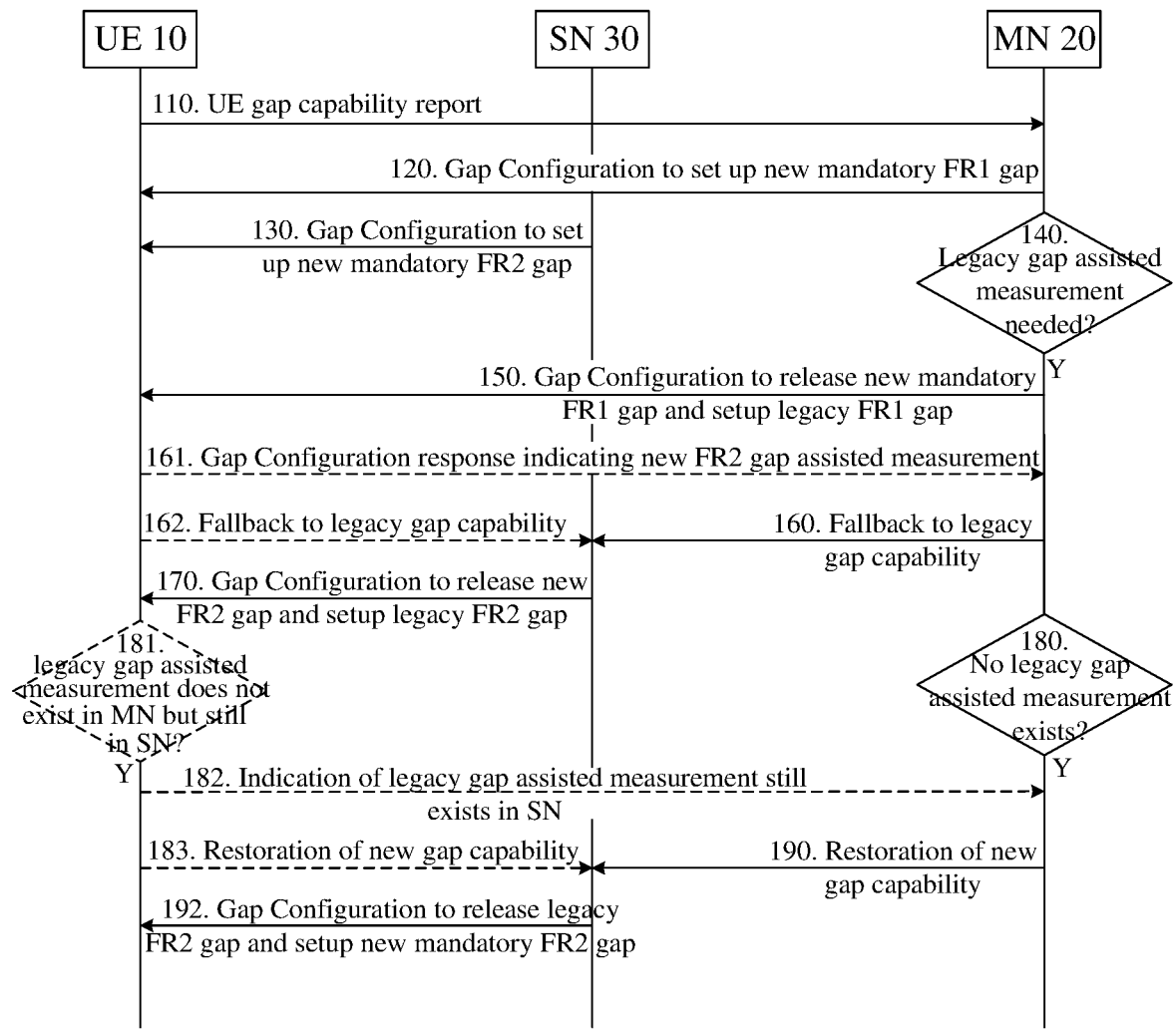
FIG. 2 illustrates a flowchart of a signaling procedure to support new conditional mandatory gap patterns (GPs) in the MR-DC architecture in accordance with exemplary embodiments.

FIG. 2 illustrates a flowchart of a signaling procedure 100 to support the new conditional mandatory GPs in the MR-DC architecture in accordance with exemplary embodiments. In the exemplary embodiments, when no legacy gap assisted measurement (or measurement object MO), e.g. a measurement in an LTE frequency, is configured by the network to the UE, the new conditional mandatory GPs may be enabled in the network including both the MN and the SN. On the other hand, if a legacy gap assisted measurement (or measurement object MO), e.g. the LTE measurement, is configured by the network to the UE, the UE cannot apply the new mandatory GPs, and the new mandatory GPs shall be disabled in the network including the MN and the SN.

Referring to FIG. 2, at 110, the UE 10 may report its measurement gap capability to the MN 20. In some embodiments, the reported UE measurement gap capability may include both the legacy gap capability and the UE new mandatory gap capability. In some embodiments, the reported UE measurement gap capability may only explicitly include the non-mandatory gap capability as the MN 20 knows that the legacy mandatory and new conditional mandatory gaps must be supported by the UE 10. The UE legacy gap capability and new conditional mandatory gap capability may be reported to the MN 20 in one message or in separate messages. For example, the measurement gap capability of the UE 10 may be included in a UECapabilityInformation message sent to the MN 20. The UECapabilityInformation message may include a plurality of information elements like shortMeasurementGap-r14 and meansGapPatterns-r15 in a UE-EUTRA-Capability container and supportedGapPattern in a UE-NR-Capability container to indicate the UE's gap capability. The UE 10 may report its gap capability to the MN 20 on its own initiative when it initially attaches to the network or when it performs a tracking area update (TAU) procedure. In some examples, the UE 10 may also report its gap capability to the MN 20 in response to a capability enquiry for example a UECapabilityEnquiry message from the MN 20. By the step 110, the MN 20 would be aware of the GPs supported by the UE 10.

At 120, the MN 20 may send a message including a measurement gap configuration to the UE 10. The measurement gap configuration may be based on the new mandatory gap capability of the UE 10 in a case where no legacy gap assisted measurement for example the LTE measurement is configured for the UE 10. In some embodiments, the MN 20 may send the new mandatory gap configuration to the UE 10 in for example a MeasConfig message. As mentioned above with reference to FIG. 1, the new mandatory gap configured by the MN 20 may be of a per-FR FR1 gap.

Similarly, the SN 30 may configure a new mandatory FR2 gap for the UE 10 by sending a message including the new mandatory FR2 gap configuration to the UE 10 at a step 130. For example, the SN 30 may encode the new mandatory FR2 gap configuration in a MeasConfig message sent to the UE 10. By the steps 120 and 130, the new conditional mandatory FR1 and FR2 gaps are configured independently for the UE 10, and the UE 10 therefore can perform measurements based on its new gap capability. Although not shown in FIG. 2, the MN 20 and the SN 30 may exchange their measurement and gap configuration information for the UE 10 through inter-node messages. The UE 10 may perform the FR1 and FR2 measurements and send respective measurement reports to the MN 20 and the SN 30, respectively.

Next at 140, the MN 20 may detect whether a legacy gap assisted measurement for example an LTE measurement is required for the UE 10. For example, when the MN 20 determines that an A or B type event needs to be measured with relation to a cell operating in an LTE frequency, the MN 20 may decide that a legacy gap assisted measurement is needed for the UE 10.

When the MN 20 decides at the step 140 that the legacy gap assisted measurement is needed for the UE 10, then the MN 20 would configure a legacy FR1 gap for the UE 10 at a step 150. For example, the MN 20 may send the UE 10 a message including a measurement gap configuration based on the UE legacy measurement gap capability. For example, the existing mandatory GPs or the UE's legacy GP capability reported by IEs shortMeasurementGap-r14 and measGapPatterns-r15 in the UE-EUTRA-Capability container and supportedGapPattern in UE-NR-Capability can be configured. If the UE 10 currently has a new mandatory gap assisted measurement in association with the MN 20, for example the new mandatory FR1 gap configured in the step 120, the message sent from the MN 20 to the UE 10 in the step 150 may further include an instruction to release the new mandatory FR1 gap.

Then at 160, the MN 20 may inform the SN 30 of the fallback to the UE legacy measurement gap capability. For example, the MN 20 may send a message including an explicit indicator for the fallback to the SN 30. In some other examples, the message may include a list of frequencies measured by the MN, and if the list of frequencies includes for example an LTE frequency, the SN 30 may know from the list of frequencies that the UE 10 needs to fall back to the legacy gap capability.

In some embodiments, optionally, in response to the legacy FR1 gap configuration received from the MN 20 at the step 150, the UE 10 may send a gap configuration response message to the MN 20 at a step 161. In the gap configuration response message, the UE 10 may indicate to the MN 20 that it still has a new FR2 gap assisted measurement in association with the SN 30, for example the FR2 gap configured in the step 130. If the MN 20 receives the gap configuration response message from the UE 10 before it sends the message 160 to the SN 30, the gap configuration response message would trigger the MN 20 to send the message 160 to the SN 30, which would make sure that the MN 20 would inform the SN 30 of the fallback to the UE legacy gap capability. If the MN 20 receives the gap configuration response message from the UE 10 after it sends the message 160 to the SN 30, the MN 20 may ignore the gap configuration response message.

In some embodiments, additionally or alternatively, the UE 10 may directly send at a step 162 a message indicating the fallback to the legacy gap capability to the SN 30 in response to the legacy FR1 gap configuration received at the step 150. This is especially beneficial in case that the MN 20 fails to send the message 160 or the SN 30 fails to receive or decode the message 160. By the message 162, the SN 30 can know that the UE 10 needs to fall back to the legacy gap capability.

Then at 170, the SN 30 may configure a legacy FR2 gap for the UE 10. For example, the SN 30 may send the UE 10 a message including a measurement gap configuration based on the UE legacy measurement gap capability. If the UE 10 currently has a new mandatory gap assisted measurement in association with the SN 30, for example the new mandatory FR2 gap configured in the step 130, the message sent from the SN 30 to the UE 10 in the step 170 may further include an instruction to release the new mandatory FR2 gap. By the steps 150 and 170, the new mandatory FR1 and FR2 gaps may be released, and the legacy FR1 and FR2 gaps may be configured. Therefore, the UE 10 falls back from its new gap capability to the legacy gap capability. With the legacy gap capability, the UE 10 may perform the legacy measurement for example the LTE measurement determined at the step 140.

Although not shown in FIG. 2, when the legacy gap assisted measurement configured in the step 150 has been performed and is no longer needed, the MN 20 may instruct the UE 10 to release the measurement. For example, the MN 20 may send a message including a measurement configuration indicating the measurement object (MO) to the released to the UE 10.

Next at 180, the MN 20 may detect whether no legacy gap assisted measurement exists for the UE 10. If the MN 20 determines at the step 180 that it does not have any legacy gap assisted measurement for the UE 10, the MN 20 may inform the SN 30 of restoration of the UE new measurement gap capability at a step 190. For example, the MN 20 may send a message including an explicit indicator for the restoration to the SN 30. In some other examples, the message may include an empty list of frequencies measured by the MN, and the SN 30 may know from the empty list that the UE 10 may now recover to the new measurement gap capability. Although not shown, the MN 20 may further configure a new conditional mandatory measurement gap for the UE 10 if it is needed.

In some embodiments, optionally, when the UE 10 receives from the MN 20 the instruction to release the legacy gap assisted measurement, the UE 10 may check at a step 181 whether the UE does not have a legacy gap assisted measurement in association with the MN 20 but still has a legacy gap assisted measurement in association with the SN 30. If yes, the UE 10 may send a message indicating that it still has a legacy gap assisted measurement with the SN 30 to the MN 20 at a step 182. If the MN 20 receives the message 182 from the UE 10 before it sends the message 190 to the SN 30, the message 182 would trigger the MN 20 to send the message 190 to the SN 30, which would make sure that the MN 20 would inform the SN 30 of the restoration of the UE new gap capability. If the MN 20 receives the message 182 from the UE 10 after it sends the message 190 to the SN 30, the MN 20 may ignore the message 182.

In some embodiments, additionally or alternatively, the UE 10 may directly send at a step 183 a message indicating the restoration of the UE new gap capability to the SN 30 when the UE 10 determines at the step 181 that it does not have a legacy gap assisted measurement in association with the MN 20 but still has a legacy gap assisted measurement in association with the SN 30. This is especially beneficial in case that the MN 20 fails to send the message 190 or the SN 30 fails to receive or decode the message 190. By any one of the messages 183 and 190, the SN 30 can know that the UE 10 may recover to the new gap capability.

At 192, the SN 30 may send a message to the UE 10 to release the legacy FR2 gap and set up a new mandatory FR2 gap. For example, the SN 30 may send a MeasGapConfig message including a measurement gap configuration based on the UE new gap capability to the UE 10. Then, the UE 10 will release the legacy FR2 gap and setup up a new mandatory FR2 gap instead.

In the above signaling procedure 100, the new mandatory gap capability may be applied in the MR-DC architecture without any impact to the legacy implementations. Especially, it would not impact the LTE measurements in the (NG)EN-DC and NR-DC deployments. By introduction of the new conditional mandatory gaps, the measurement delay and gap overhead would be improved, and the measurement efficiency can be enhanced.

In the above description, the signaling messages are described in multiple discrete operations in turn, in a manner that is most helpful to understand the exemplary embodiments detailed herein. However, it should be understood that the order of description should not be construed as to imply that these signaling messages/operations are necessarily limited to the order of description. The described signaling messages/operations may be performed in a different order than the described embodiments. Various additional signalings/operations may be performed and/or described signalings/operations may be omitted in additional embodiments.

Figure 3:
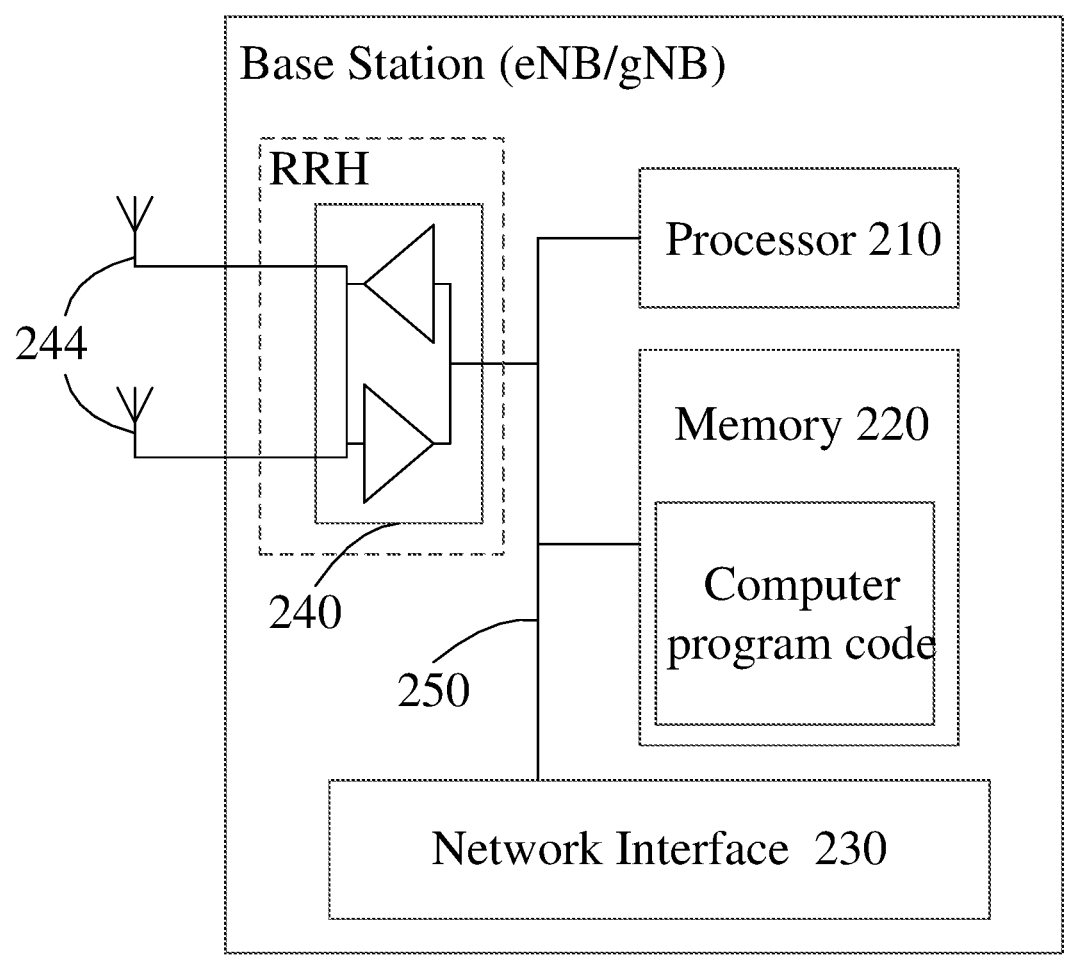
FIG. 3 illustrates a block diagram of a network device in accordance with exemplary embodiments.

FIG. 3 illustrates a block diagram of a network device in accordance with exemplary embodiments. The network device 200 is a base station that provides access for wireless devices such as the UE 10 to a wireless network such as the 5G NR network. The base station 200 may be a 5G NR Node-B (gNB) or a 4G LTE Node-B (eNB). In the MR-DC architecture, the network device 200 may be implemented as the MN 20 or the SN 30 described above with reference to FIGS. 1-2.

Referring to FIG. 3, the network device 200 includes one or more processors 210, one or more memories 220, one or more network interfaces 230, and one or more transceivers 240 interconnected through one or more buses 250. The one or more processors 210 may execute computer program codes stored in the one or more memories 220 coupled thereto and control the network device 200 to implement various operations described herein. Each of the one or more transceivers 240 may include a receiver and a transmitter, and the one or more transceivers 240 may be connected to one or more antennas 244. The one or more network interfaces 230 may communicate with other network devices for example another base station or a core network such as EPC or 5GC. The one or more buses 250 may be address, data or control buses and may include any interconnection mechanism, such as a series of lines on a motherboard or integrated circuit, fiber optics or other optical communication equipment, wireless channels and the like. For example, when the network device 200 is implemented as a gNB, the one or more transceivers 240 may be implemented as a remote radio head (RRH) or as a Distribution Unit (DU) with the other elements of the gNB 200 being physically in a different location from the RRH, for example in a Central Unit (CU), and the one or more buses 250 may be implemented in part as a fiber optical cable to connect the other elements of the gNB 200 to the RRH/DU.

It would be understood that when the network device 200 is implemented as a gNB or an eNB, the network device 200 may act as a master node (MN) in an (NG)EN-DC or NR-DC architecture and the one or more memories 220 and the computer program code stored therein may be configured to, with the one or more processors 210, cause the network device 200 to perform operations relating to the MN 20 as described above with reference to FIGS. 1-2. When the network device 200 is implemented as a gNB, the network device 200 may act as a secondary node (SN) in an (NG)EN-DC or NR-DC architecture and the one or more memories 220 and the computer program code stored therein may be configured to, with the one or more processors 210, cause the network device 200 to perform operations relating to the SN 30 as described above with reference to FIGS. 1-2.

Figure 4:
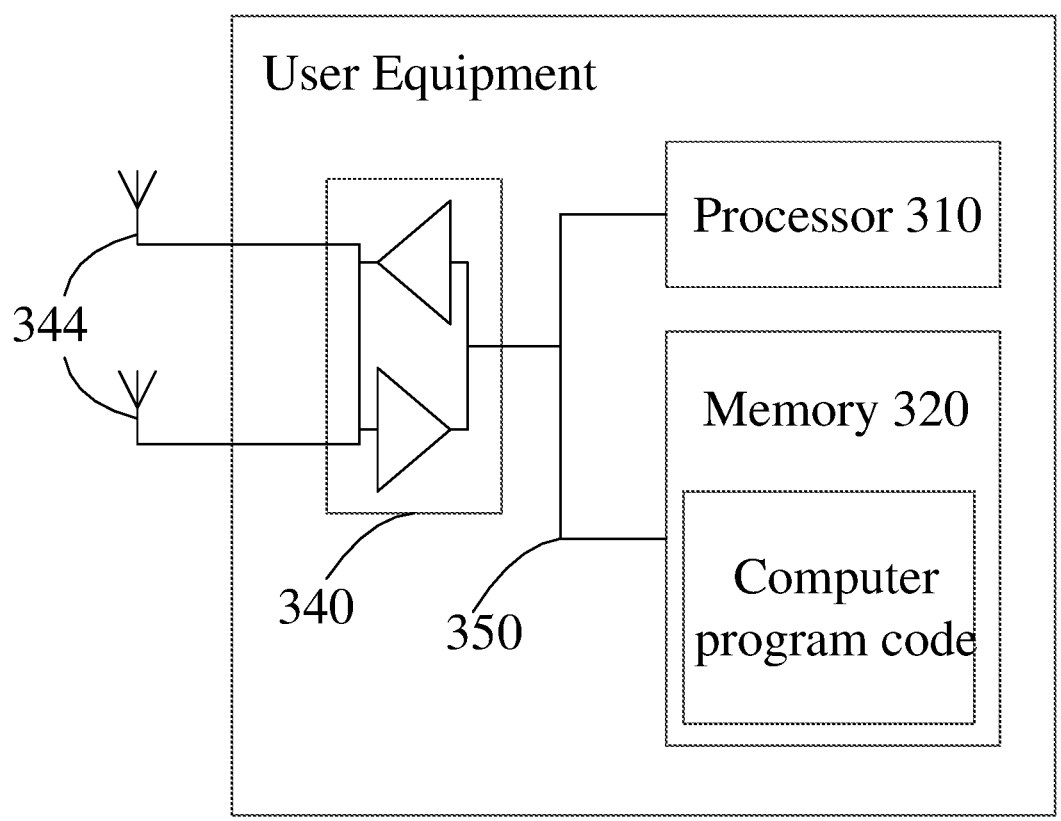
FIG. 4 illustrates a block diagram of a user equipment in accordance with exemplary embodiments.

FIG. 4 illustrates a block diagram of a user equipment (UE) in accordance with exemplary embodiments. The UE 300 may be a wireless, typically mobile device that can wirelessly communicate with the network device 200 in FIG. 3, and it may be implemented as the UE 10 described above with reference to FIGS. 1-2.

Referring to FIG. 4, the UE 300 includes one or more processors 310, one or more memories 320 and one or more transceivers 340 interconnected through one or more buses 350. Each of the one or more transceivers 340 may include a receiver and a transmitter, and the one or more transceivers 340 may be connected to one or more antennas 344. The one or more buses 350 may be address, data or control buses and may include any interconnection mechanism, such as a series of lines on a motherboard or integrated circuit, fiber optics or other optical communication equipment, wireless channels and the like. The one or more memories 320 may include computer program code stored therein. The one or more memories 320 and the computer program code may be configured to, with the one or more processors 310, cause the UE 300 to perform operations relating to the UE 10 described above with reference to FIGS. 1-2.

The one or more processors 210, 310 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 210, 310 may be configured to control other elements of the network device/user equipment and operate in cooperation with them to implement the procedures discussed above.

The one or more memories 220, 320 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 220, 320 may include but not limited to an electric, a magnetic, an optical, an electromagnetic, an infrared, or a semiconductor system, apparatus, or device or any combination of the above.

Figure 5:
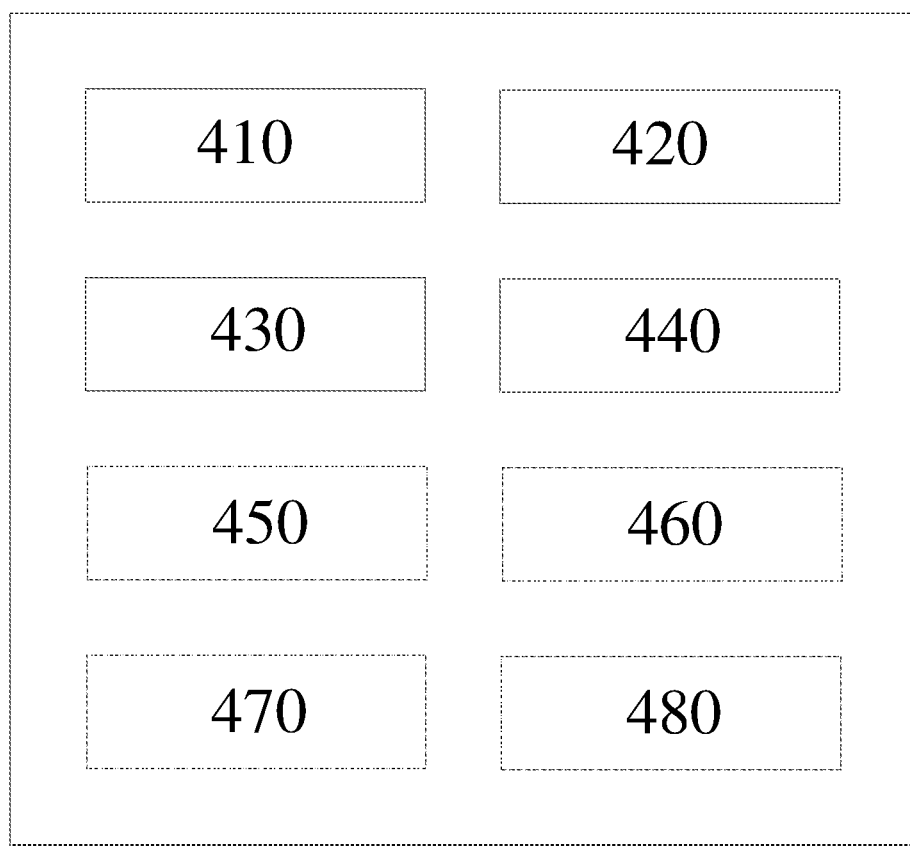
FIG. 5 illustrates a block diagram of an apparatus in accordance with exemplary embodiments.

FIG. 5 illustrates a block diagram of an apparatus 400 in accordance with exemplary embodiments. It would be understood that the apparatus 400 may be implemented in the network device 200 acting as a master node in FIG. 3 to perform operations relating to the MN 20 in the signaling procedure 100 of FIG. 2 but is not limited thereto.

Referring to FIG. 5, the apparatus 400 may comprise a first unit 410, a second unit 420, a third unit 430 and a fourth unit 440 for performing the operations 120, 140, 150 and 160 in FIG. 2, respectively. In particular, the first unit 410 may be configured to send a first message including a first measurement gap configuration from a first network device to a user equipment UE, the first measurement gap configuration being based on a UE new measurement gap capability. The second unit 420 may be configured to detect at the first network device whether a legacy gap assisted measurement is required for the UE. The third unit 430 may be configured to, responsive to the legacy gap assisted measurement being required, send a second message including a second measurement gap configuration from the first network device to the UE, the second measurement gap configuration being based on a UE legacy measurement gap capability. The fourth unit 440 may be configured to send a third message indicating fallback of the UE to the legacy measurement gap capability from the first network device to a second network device in communication with the UE.

In some embodiments, the apparatus 400 may optionally comprise a fifth unit 450, a sixth unit 460, a seventh unit 470 and a eighth unit 480 for performing the operations 161, 180, 182 and 192 in FIG. 2, respectively. In particular, the fifth unit 450 may be configured to, after sending the second message, receive at the first network device a fifth message from the UE indicating that the UE still has a measurement associated with the second network device based on the UE new measurement gap capability; the sixth unit 460 may be configured to detect at the first network device whether no legacy gap assisted measurement exists for the UE; the seventh unit 470 may be configured to, responsive to no legacy gap assisted measurement existing, sending a fourth message indicating restoration of the UE new measurement gap capability from the first network device to the second network device; the eighth unit 480 may be configured to receive at the first network device a sixth message from the UE indicating that the UE still has a legacy gap assisted measurement associated with the second network device.

Figure 6:
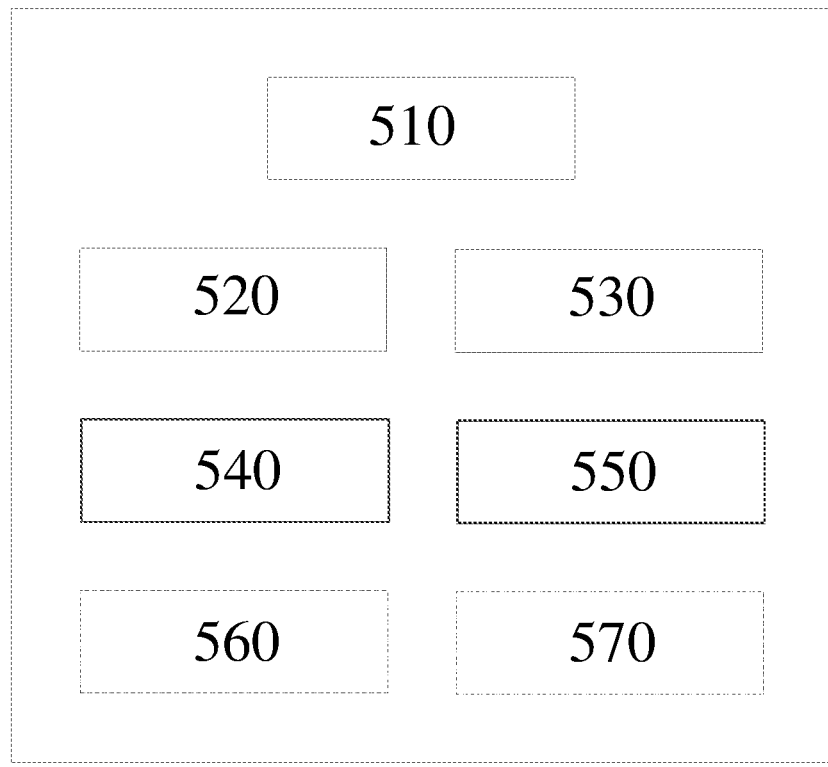
FIG. 6 illustrates a block diagram of an apparatus in accordance with exemplary embodiments.

FIG. 6 illustrates a block diagram of an apparatus 500 in accordance with exemplary embodiments. It would be understood that the apparatus 500 may be implemented in the network device 200 acting as a secondary node in FIG. 3 to perform operations relating to the SN 30 in the signaling procedure 100 of FIG. 2 but is not limited thereto.

Referring to FIG. 6, the apparatus 500 may comprise a first unit 510, a second unit 520, and a third unit 530 for performing the operations 130, 160 or 162, and 170 in FIG. 2, respectively. In particular, the first unit 510 may be configured to send a first message including a first measurement gap configuration from a second network device to a user equipment UE, the first measurement gap configuration being based on a UE new measurement gap capability; the second unit 520 may be configured to receive at the second network device a second message from a first network device or from the UE indicating fallback to a UE legacy measurement gap capability; the third unit 530 may be configured to, responsive to the second message, send a third message including a second measurement gap configuration from the second network device to the UE, the second measurement gap configuration being based on the UE legacy measurement gap capability.

In some embodiments, the apparatus 500 may optionally comprise a fifth unit 550 and a sixth unit 560 for performing the operation 183 or 190 and the operation 192 in FIG. 2, respectively. In particular, the fifth unit 550 may be configured to receive at the second network device a fourth message from the first network device or from the UE indicating restoration of the UE new measurement gap capability; and the sixth unit 560 may be configured to, responsive to the fourth message, send a fifth message including a third measurement gap configuration from the second network device to the UE, the third measurement gap configuration being based on the UE new measurement gap capability.

Figure 7:
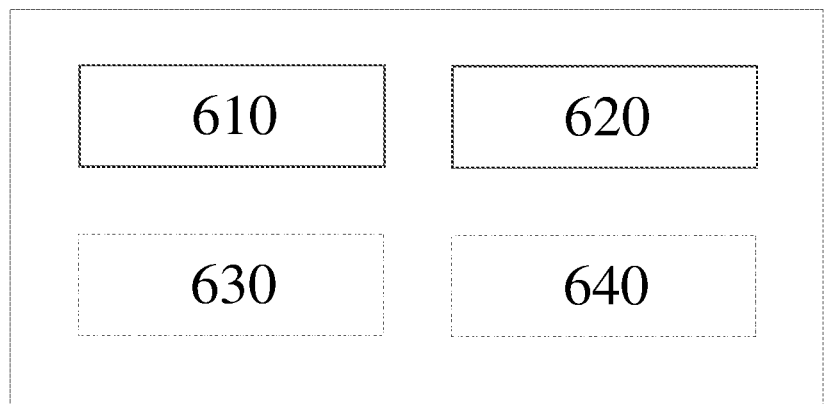
FIG. 7 illustrates a block diagram of an apparatus in accordance with exemplary embodiments.

FIG. 7 illustrates a block diagram of an apparatus 600 in accordance with exemplary embodiments. It would be understood that the apparatus 600 may be implemented in the user equipment 300 in FIG. 4 to perform operations relating to the UE 10 in the signaling procedure 100 of FIG. 2 but is not limited thereto.

Referring to FIG. 7, the apparatus 600 may comprise a first unit 610 and a second unit 620 for performing the operation 150 and the operations 161 and/or 162 in FIG. 2, respectively. In particular, the first unit 610 may be configured to receive at a user equipment UE a first message including a first measurement gap configuration from a first network device, the first measurement gap configuration being based on a UE legacy measurement gap capability; and the second unit 620 may be configured to, responsive to the first message, send a second message indicating fallback of the UE to the legacy measurement gap capability to a second network device in communication with the UE, and/or a third message indicating that the UE still has a measurement associated with the second network device based on a UE new measurement gap capability to the first network device in a case where the UE still has the measurement associated with the second network device based on the UE new measurement gap capability.

In some embodiments, the apparatus 600 may optionally comprise a third unit 630 and a fourth unit 640 for performing the operation 181 and the operations 182 and/or 183 in FIG. 2, respectively. In particular, the third unit 630 may be configured to detect at the UE whether the UE does not have a legacy gap assisted measurement in association with the first network device but still has a legacy gap assisted measurement in association with the second network device; and the fourth unit 640 may be configured to, if the UE does not have a legacy gap assisted measurement in association with the first network device but still has a legacy gap assisted measurement in association with the second network device, send a fourth message indicating that the UE still has a legacy gap assisted measurement associated with the second network device to the first network device, and/or a fifth message indicating restoration of the UE new measurement gap capability to the second network device.

It is to be understood that each unit in the apparatuses 400, 500 and 600 corresponds to respective steps in the procedure 100 described with reference to FIGS. 1-2. Therefore, operations and features described above with reference to FIGS. 1-2 are also applicable to the apparatuses 400, 500, 600 as well as the units included therein, and meanwhile have the same effects, details of which are omitted herein.

The units included in the apparatuses 400, 500, 600 may be implemented in various manners, including software, hardware, firmware, or any combination thereof. In some embodiments, one or more units may be implemented using software and/or firmware, for example, machine-executable instructions stored in the storage medium. In addition to or instead of machine-executable instructions, parts or all of the units in the apparatuses 400, 500, 600 may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause an apparatus to perform the procedures described above. Some exemplary embodiments further provide a computer program product or a computer readable medium having the computer program code or instructions stored therein.

Generally, various exemplary embodiments may be implemented in hardware or special purpose circuits, software, logic or any combination thereof. Some aspects may be implemented in hardware, while other aspects may be implemented in firmware or software which may be executed by one or more processors, controllers, microprocessors or other computing devices. While various aspects of exemplary embodiments are illustrated and described as block diagrams, flowcharts, or using some other pictorial representations, it will be appreciated that the blocks, devices, apparatuses, systems, techniques or methods described herein may be implemented in, as non-limiting examples, hardware, software, firmware, special purpose circuits or logic, general purpose hardware or controller or other computing devices, or some combination thereof.

For example, exemplary embodiments can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the exemplary embodiments, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A method for measurement gap configuration, comprising:
   sending a first message including a first measurement gap configuration from a first network device to a user equipment UE, the first measurement gap configuration being based on a UE new measurement gap capability;
   detecting at the first network device whether a legacy gap assisted measurement is required for the UE;
   responsive to the legacy gap assisted measurement being required, sending a second message including a second measurement gap configuration from the first network device to the UE, the second measurement gap configuration being based on a UE legacy measurement gap capability; and
   sending a third message indicating fallback of the UE to the legacy measurement gap capability from the first network device to a second network device in communication with the UE.

2. A method for measurement gap configuration, comprising:
   sending a first message including a first measurement gap configuration from a second network device to a user equipment UE, the first measurement gap configuration being based on a UE new measurement gap capability;
   receiving at the second network device a second message from a first network device or from the UE indicating fallback to a UE legacy measurement gap capability; and
   responsive to the second message, sending a third message including a second measurement gap configuration from the second network device to the UE, the second measurement gap configuration being based on the UE legacy measurement gap capability.

3. A method for measurement gap configuration, comprising:
   receiving at a user equipment UE a first message including a first measurement gap configuration from a first network device, the first measurement gap configuration being based on a UE legacy measurement gap capability; and
   responsive to the first message, sending a second message indicating fallback of the UE to the legacy measurement gap capability to a second network device in communication with the UE, and/or a third message indicating that the UE still has a measurement associated with the second network device based on a UE new measurement gap capability to the first network device in a case where the UE still has the measurement associated with the second network device based on the UE new measurement gap capability.

4. A network device comprising:
   at least one processor; and
   at least one memory including computer program code, the at least one memory and the computer program code configured to, with the at least one processor, cause the network device at least to perform:
     send a first message including a first measurement gap configuration to a user equipment UE, the first measurement gap configuration being based on a UE new measurement gap capability;
     detect whether a legacy gap assisted measurement is required for the UE;
     responsive to the legacy gap assisted measurement being required, send a second message including a second measurement gap configuration to the UE, the second measurement gap configuration being based on a UE legacy measurement gap capability; and send a third message indicating fallback of the UE to the legacy measurement gap capability to a further network device in communication with the UE.

5. The network device of claim 4 wherein the at least one memory and the computer program code are further configured to, with the at least one processor, cause the network device at least to perform, after sending the second message:

receive a fifth message from the UE indicating that the UE still has a measurement associated with the further network device based on the UE new measurement gap capability.

6. The network device of claim 4 wherein the at least one memory and the computer program code are further configured to, with the at least one processor, cause the network device at least to:

detect whether no legacy gap assisted measurement exists for the UE;

responsive to no legacy gap assisted measurement existing, send a fourth message indicating restoration of the UE new measurement gap capability to the further network device.

7. The network device of claim 6 wherein the at least one memory and the computer program code are further configured to, with the at least one processor, cause the network device at least to:

receive a sixth message from the UE indicating that the UE still has a legacy gap assisted measurement associated with the further network device.

8. The network device of claim 6 wherein the third message includes an explicit indicator or a list of frequencies measured by the legacy gap assisted measurement to indicate the fallback, and the fourth message includes an explicit indicator or an empty list of frequencies measured by the legacy gap assisted measurement to indicate the restoration.

9. The network device of claim 4 wherein the network device acts as a master node (MN) for a master cell group (MCG) operated in a first frequency range (FR1), and the further network device acts as a secondary node (SN) for a secondary cell group (SCG) operated in a second frequency range (FR2).

10. The network device of claim 9 wherein the UE operates in a dual connectivity mode, e.g., EN-DC, NGEN-DC or NR-DC mode, to communicate with both the network device and the further network device, and is configured with respective measurement gap configurations from the network device and the further network device independently.

11. The network device of claim 4 wherein the first measurement gap configuration and the second measurement gap configuration are per-frequency range (per-FR) configurations.

12. The network device of claim 4 wherein the legacy gap assisted measurement comprises a measurement to an LTE frequency.

13. The network device of claim 4 wherein the UE legacy measurement gap capability comprises a static gap capability, and the UE new measurement gap capability comprises a conditional mandatory gap capability applied when no legacy gap assisted measurement exists.

14. The network device of claim 4 wherein the UE legacy measurement gap capability comprises a gap capability defined in 3 GPP Release 15, and the UE new measurement gap capability comprises a conditional mandatory gap capability introduced in 3 GPP Release 16 or later.

15. A network device comprising:

at least one processor; and at least one memory including computer program code, the at least one memory and the computer program code configured to, with the at least one processor, cause the network device at least to:

send a first message including a first measurement gap configuration to a user equipment UE, the first measurement gap configuration being based on a UE new measurement gap capability;

receive a second message from a further network device or from the UE indicating fallback to a UE legacy measurement gap capability; and responsive to the second message, send sending-a third message including a second measurement gap configuration to the UE, the second measurement gap configuration being based on the UE legacy measurement gap capability.

16. The network device of claim 15 wherein the at least one memory and the computer program code are further configured to, with the at least one processor, cause the network device at least to:

receive a fourth message from the further network device or the UE indicating restoration of the UE new measurement gap capability; and responsive to the fourth message, send a fifth message including a third measurement gap configuration to the UE, the third measurement gap configuration being based on the UE new measurement gap capability.

17. A user equipment UE comprising:

at least one processor; and at least one memory including computer program code, the at least one memory and the computer program code configured to, with the at least one processor, cause the UE at least to:

receive a first message including a first measurement gap configuration from a first network device, the first measurement gap configuration being based on a UE legacy measurement gap capability; and responsive to the first message, send a second message indicating fallback of the UE to the legacy measurement gap capability to a second network device in communication with the UE, and/or a third message indicating that the UE still has a measurement associated with the second network device based on a UE new measurement gap capability to the first network device in a case where the UE still has the measurement associated with the second network device based on the UE new measurement gap capability.

18. The UE of claim 17 wherein the at least one memory and the computer program code are further configured to, with the at least one processor, cause the UE at least to:

detect whether the UE does not have a legacy gap assisted measurement in association with the first network device but still has a legacy gap assisted measurement in association with the second network device;

if so, send a fourth message indicating that the UE still has a legacy gap assisted measurement associated with the second network device to the first network device, and/or a fifth message indicating restoration of the UE new measurement gap capability to the second network device.

\* \* \* \* \*